Feb. 4, 1958    H. S. CAHEN ET AL    2,821,999
VALVE STRUCTURE
Filed June 22, 1954
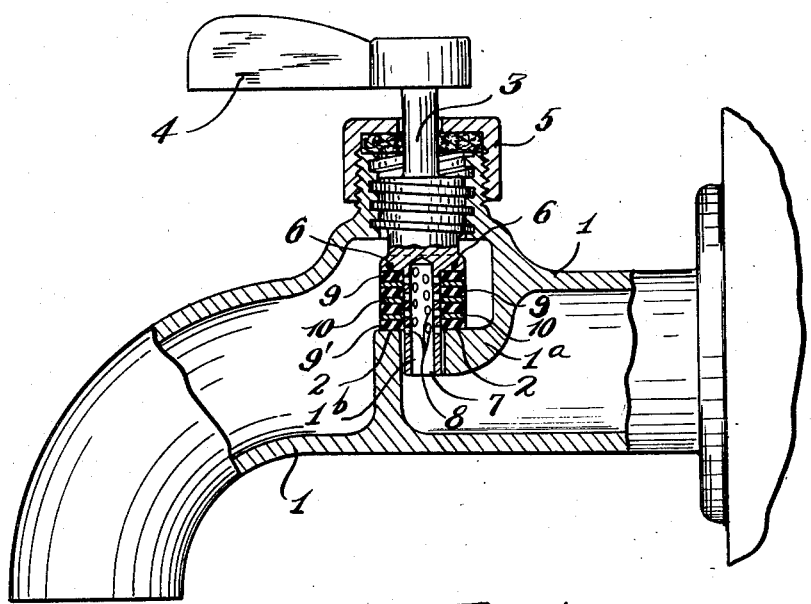
FIG. 1
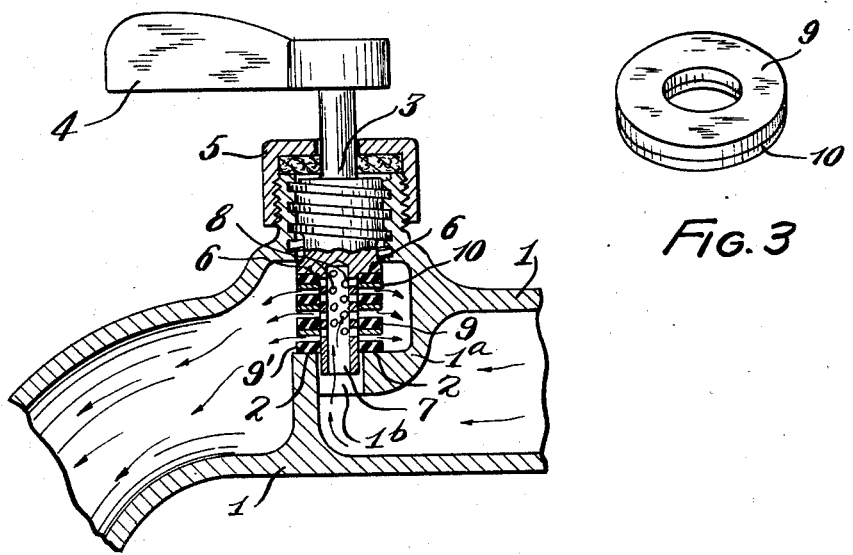
FIG. 2
FIG. 3
INVENTORS.
HERMAN S. CAHEN
BY ALFRED B. CAHEN
ATTORNEYS

United States Patent Office

2,821,999
Patented Feb. 4, 1958

2,821,999

VALVE STRUCTURE

Herman S. Cahen and Alfred B. Cahen,
University Heights, Ohio

Application June 22, 1954, Serial No. 438,377

3 Claims. (Cl. 137—625.39)

This invention relates to the general art of valve structures and is particularly adapted for use in a faucet, the present form of device being an improvement upon that shown in our co-pending application Serial No. 375,972, filed August 24, 1953, now Patent No. 2,768,645.

As explained in our application above referred to, the gasket in the familiar modern-day faucet is subjected to considerable wear and is of comparatively short life due to the rotary grinding action of the same between the valve and its seat.

Therefore, as in our co-pending application, so here also our object is to devise a faucet assembly in which the gasket has such form and arrangement that it is relieved of the grinding action between the valve and valve seat and in which the life of the gasket is accordingly lengthened and there is assured more dependable sealing engagement.

Also, it is an object of the present invention, as in our co-pending application, to devise an assembly in which the force of the water flow will tend to initiate and to increase the opening of the passage therethrough when the faucet is turned to open position.

Another object is to devise an assembly in which there is movement of the gasket means during opening and closing of the valve so as to thereby prevent sticking of the gasket and to tend to maintain the same in effective condition.

Another object is to devise an assembly in which adequate flow therethrough may be obtained without turning the valve to such a great extent as in the present-day form of device.

Another object is to devise an improved form of composite gasket in which a rubber or rubber-like element is bonded to a non-corrosive metallic element so as to facilitate handling of the same in an assembly embodying alternating rubber and metallic gasket elements as herein contemplated.

Other objects will appear from the following description and claims when considered together with the accompanying drawing.

Fig. 1 is a view partly in elevation and partly in section illustrating our new form of device;

Fig. 2 is a sectional view illustrating our form of valve in open position whereas in Fig. 1 it is indicated as in closed position;

Fig. 3 is a perspective view of one of our bonded composite gaskets.

In the present case the body part 1 of the faucet has a web portion 1a therewithin having a passage 1b therethrough and a squared valve seat 2 which extends in a plane that is normal to the axis of rotary movement of the valve stem 3 which has screw-threaded engagement within the body 1 and is adapted for manipulation by the handle 4 in the regular manner. The usual screw-threaded cap 5 and its sealing gasket are also provided upon the body part 1 and about the stem 3. The stem 3 is provided with a squared annular surface 6 that occupies a plane parallel to that of the squared surface 2 of the valve seat.

Depending from the center of the valve stem 3 is the integral hollow cylindrical portion 7 which has suitable uniform clearance within the body part 1 and has a plurality of uniformly spaced apertures 8 of suitable number and size through the upper part of the wall thereof. The hollow portion 7 is closed at its upper end and is open at its lower end and is adapted to project down into the passage 1b at all times for centering the valve even when the valve is in open position.

The valve seat 2 and the surface 6 are of the same diameter and are adapted to occupy concentric relationship to each other at all times; and we have provided an improved sealing means of approximately the same diameter as and arranged concentrically between these squared surfaces 2 and 6 and co-axially of the apertured hollow cylindrical portion 7. This sealing means consists of a plurality of duplicate composite gaskets each of which comprises a portion 9 of rubber or other elastic sealing composition and a portion 10 of non-corrosive metallic material as for instance brass. In each instance the rubber and brass disks are bonded together and they are arranged in assembly with the rubber of one composite disk adjacent the brass of another disk so that there is a series of alternating rubber and brass elements. The rubber face of the upper-most composite disk may have engagement with the squared face 6 of the valve stem; and, if so desired, the lower-most composite gasket may consist of an intermediate brass portion and upper and lower rubber portions bonded together so as to provide a rubber surface to engage the squared surface 2 as well as a rubber surface to engage the metal surface of the next composite gasket in case these composite gaskets are arranged with their rubber portions facing upwardly. If these composite gaskets are arranged with their rubber portions facing downwardly, then such a special three-layer gasket may be placed between the upper-most two-part gasket and the squared face 6. Or, a separate rubber washer may be employed between the lower-most two-part sealing gasket and the surface 2 or between the upper-most two-part gasket and the flat surface 6. In either arrangement there may be obtained alternating inter-engaging rubber and brass elements throughout, including the squared surfaces 2 and 6 which may also be of a non-corrosive metal as for instance brass. A separate rubber washer is here shown at 9'.

It is to be understood that in operating this faucet, the handle will be manipulated in the same manner as in the present-day faucet. Upon turning the handle for closing, the composite sealing gaskets will be compressed between the squared surfaces 2 and 6 so as to produce an effective seal. Then, upon turning the handle for opening, this compressive engagement will be relieved and the force of the water in the pipe line will cause separation of the composite gaskets so as to permit flow up through the tubular portion 7 and laterally out through the apertures 8 and thence out between the composite gaskets for discharge from the regular spout of the faucet. There may be also flow of the water or other fluid between the outside of the tubular portion 7 and the part 1 and thence out between the composite gaskets.

Our present form of faucet may be turned from fully open to fully closed position and vice versa with substantially less turning movement of the handle than in the case of the present-day conventional faucet. The force of the water or other fluid tends to open the valve. There may be obtained effective sealing against any leakage upon turning to "off" position. The danger of sticking of the gaskets and the danger of inordinate wear upon the gaskets are reduced to a practical nil. Our tier of composite sealing gaskets affords a comparatively large aggregate discharge opening with correspondingly large aggregate sealing surface area, thereby ensuring efficient and dependable opening and closing as well as sealing. Also, with our composite form of sealing gasket, the handling of the same is greatly facilitated and there is made possible a valve by which the flow of water or other fluid may be quickly initiated and quickly discontinued, this by virtue of the aggregate capacity and arrangement of the multiple apertures 8 and passages between the gaskets 9—10.

It is to be understood that the present form of disclosure is merely for the purpose of illustration and that there might be devised various modifications thereof without departing from the spirit of our invention as herein set forth and claimed.

What we claim is:

1. A valve structure comprising a body with a passage therethrough for the flow of fluid and having a valve seat, a screw closure member having a hollow cylindrical portion that extends into said passage and that is closed at its upper end and is open at its lower end and is open laterally through the wall of the upper part thereof and has an outer annular flange at the upper end thereof co-axially with respect to said valve seat, and gasket means including washers of sealing elastic and non-corrosive metallic materials bonded together and arranged co-axially about said cylindrical portion in the region of the laterally open portion thereof and adapted to have sealing engagement between said annular flange and said seat for closing the laterally open passage through said cylindrical portion when the valve is in closed position and adapted to be moved to open position by the force of the fluid through the open portion of said cylindrical portion when the valve is moved to open position.

2. The same structure as recited in claim 1 hereof and in which the interengaging surfaces of said valve seat, annular portion and gasket means are substantially normal to the longitudinal axis of said cylindrical portion and are of substantially the same radial extent.

3. The same structure as recited in claim 1 hereof and in which the interengaging surfaces of said valve seat, annular portion and gasket means are substantially normal to the longitudinal axis of said cylindrical portion and in which said gasket means is of substantially the same diameter as that of the aforesaid valve seat of the said body and in which said cylindrical portion is spaced from said valve seat member and from said gasket means.

References Cited in the file of this patent

UNITED STATES PATENTS

| | | |
|---|---|---|
| 1,295,394 | Voorhees | Feb. 25, 1919 |
| 2,677,526 | Johnson | May 4, 1954 |

FOREIGN PATENTS

| | | |
|---|---|---|
| 28,127 | Great Britain | of 1911 |
| 547,104 | Great Britain | of 1942 |